(12) United States Patent
Venkatasubramanian et al.

(10) Patent No.: US 12,701,517 B2
(45) Date of Patent: Aug. 4, 2026

(54) HEIGHT DEPENDENT TRANSMISSION FROM AERIAL WIRELESS DEVICES

(71) Applicant: Telefonaktiebolaget LM Ericsson (publ), Stockholm (SE)

(72) Inventors: Sathya Narayana Venkatasubramanian, Upplands Väsby (SE); Muhammad Ali Kazmi, Sundbyberg (SE); Dominique Everaere, Åkersberga (SE); Olav Queseth, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 492 days.

(21) Appl. No.: 17/780,307

(22) PCT Filed: Dec. 4, 2020

(86) PCT No.: PCT/SE2020/051167
§ 371 (c)(1),
(2) Date: May 26, 2022

(87) PCT Pub. No.: WO2021/112751
PCT Pub. Date: Jun. 10, 2021

(65) Prior Publication Data
US 2022/0417865 A1      Dec. 29, 2022

Related U.S. Application Data

(60) Provisional application No. 62/943,905, filed on Dec. 5, 2019.

(51) Int. Cl.
*H04W 52/28* (2009.01)
*B64U 10/00* (2023.01)
(Continued)

(52) U.S. Cl.
CPC .......... *H04W 52/283* (2013.01); *B64U 10/00* (2023.01); *H04W 52/244* (2013.01); *H04W 52/285* (2013.01); *H04W 72/0473* (2013.01)

(58) Field of Classification Search
CPC ... H04W 52/283; H04W 52/44; H04W 52/38; H04W 52/285; H04W 72/0473; B64U 10/00; B64U 2101/00
See application file for complete search history.

(56) References Cited

U.S. PATENT DOCUMENTS

| | | |
|---|---|---|
| 2018/0359710 A1 | 12/2018 | Desclos et al. |
| 2020/0213956 A1* | 7/2020 | Fridén ................. H04W 52/283 |

(Continued)

FOREIGN PATENT DOCUMENTS

| | | |
|---|---|---|
| CN | 110447270 A | 11/2019 |
| WO | 2019160461 A1 | 8/2019 |

OTHER PUBLICATIONS

CN110710280A, Desclos et al., Having a power control method of the system of height change object, Jan. 2020, pp. 1-10 (Year: 2020).*

(Continued)

*Primary Examiner* — Keith Ferguson
(74) *Attorney, Agent, or Firm* — Sage Patent Group

(57) ABSTRACT
A method, network node and aerial wireless device (AWD) for height based out of band emission control of the AWD are disclosed. A network node configured to communicate with an AWD is provided. According to one aspect, a network node is configured to signal emission control parameter information for modifying a transmission power of the AWD based at least in part on a height of the wireless device.

10 Claims, 9 Drawing Sheets

(51) Int. Cl.
   H04W 52/24 (2009.01)
   H04W 72/044 (2023.01)

(56) References Cited

U.S. PATENT DOCUMENTS

2021/0051595 A1* 2/2021 Rico Alvarino .... H04W 52/283
2022/0070792 A1* 3/2022 Lekutai ............... H04W 52/282

OTHER PUBLICATIONS (WO 2018184696 A1) Wang et al., A Network Device and Method for Allocating Radio Resources to Remote Devices, Oct. 11, 2018, pp. 1-8 (Year: 2018).*
International Search Report and Written Opinion dated Mar. 3, 2021 for International Application No. PCT/EP2020/051167 filed Dec. 4, 2020, consisting of 11 pages.
3GPP TSG RAN WG1 Meeting #92bis R1-1803889; Title: Uplink power control for aerial UEs; Agenda Item: 6.2.9.1; Source: Huawei, HiSilicon; Document for: Discussion and decision; Location and Date: Sanya, China, Apr. 16-20, 2018, consisting of 8 pages.
3GPP TSG RAN WG1 Meeting #91 R1-1720110; Title: UL enhancements for drones; Agenda Item: 6.2.7.3; Source: Huawei, HiSilicon; Document for: Discussion and decision; Location and Date: Reno, USA, Nov. 27-Dec. 1, 2017, consisting of 4 pages.
Ericsson; 3GPP TSG-RAN WG1 Meeting #93; R1-1807154; "On UL power control enhancements for LTE Aerials"; Agenda Item 6.2.9; Busan, Korea; May 21-25, 2018; 5 pages.
Office Action mailed Oct. 24, 2024 for CN Application No. 202080095401.3, 17 pages (includes English translation).
Motorola; 3GPP TSG-RAN Meeting #49bis; R4-08329; "NS_07 emission table"; Ljubljana, Slovenia; Jan. 12-16, 2009; 3 pages.
Communication pursuant to Article 94(3) EPC mailed Jul. 22, 2025 for European Patent Application No. 20824706.4, 4 pages.

* cited by examiner

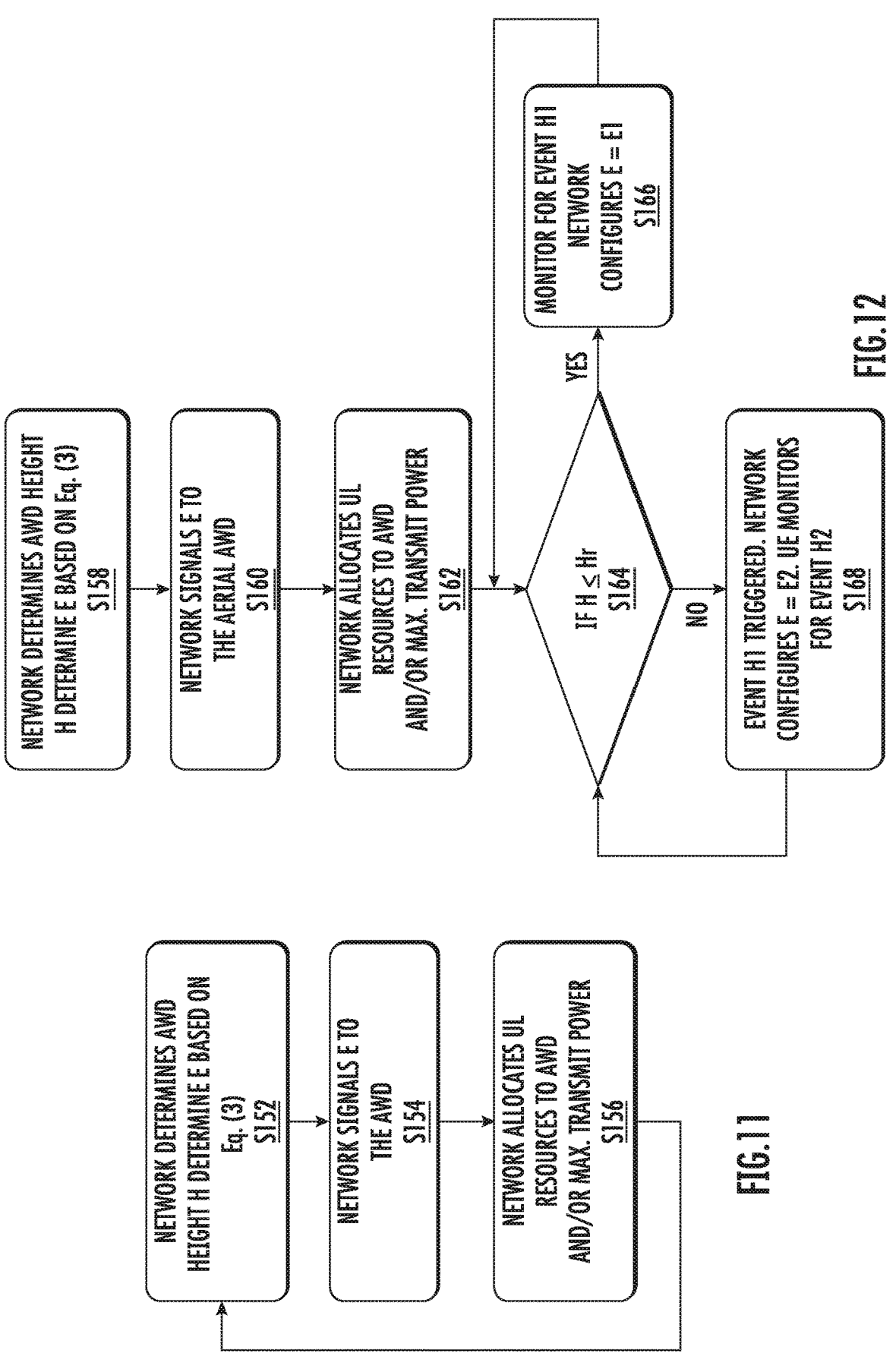

NETWORK DETERMINES AWD HEIGHT H DETERMINE E BASED ON Eq. (3)
S158

NETWORK SIGNALS E TO THE AERIAL AWD
S160

NETWORK ALLOCATES UL RESOURCES TO AWD AND/OR MAX. TRANSMIT POWER
S162

IF H ≤ Hr
S164

YES

MONITOR FOR EVENT H1
NETWORK CONFIGURES E = E1
S166

NO

EVENT H1 TRIGGERED. NETWORK CONFIGURES E = E2. UE MONITORS FOR EVENT H2
S168

FIG. 12

NETWORK DETERMINES AWD HEIGHT H DETERMINE E BASED ON Eq. (3)
S152

NETWORK SIGNALS E TO THE AWD
S154

NETWORK ALLOCATES UL RESOURCES TO AWD AND/OR MAX. TRANSMIT POWER
S156

FIG. 11

HEIGHT DEPENDENT TRANSMISSION FROM AERIAL WIRELESS DEVICES

CROSS-REFERENCE TO RELATED APPLICATIONS

This application is a Submission Under 35 U.S.C. § 371 for U.S. National Stage Patent Application of International Application No.: PCT/SE2020/051167, filed Dec. 4, 2022 entitled "HEIGHT DEPENDENT TRANSMISSION FROM AERIAL WIRELESS DEVICES," which claims priority to U. S. Provisional Application No.: 62/943,905, filed Dec. 5, 2019, entitled "HEIGHT DEPENDENT TRANSMISSION FROM AERIAL UES," the entireties of both of which are incorporated herein by reference.

TECHNICAL FIELD

The present disclosure relates to wireless communications, and in particular, to height based power control for aerial wireless devices.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

The number of aerial wireless devices, e.g., drones, flying in the air will likely increase in the future. There is interest in having 3GPP networks support aerial wireless device operation in order to, for example, allow the aerial wireless devices to operate beyond Line-of-Sight (LoS) conditions. Some of these features have been standardized in 3GPP Release-15 to support the operation of aerial wireless devices and may relate to height-based measurement reporting to the network node.

The use of aerial wireless devices may pose additional challenges in terms of interference as the aerial wireless devices are "visible" to multiple base stations. The propagation conditions for the radio signal between the aerial wireless device and network node may be more significant than typical propagation conditions for other wireless devices. This is because aerial wireless devices may have LoS or strong paths to network nodes when they are flying above obstructions, e.g., greater than 30 m height.

Currently, frequency bands below 3.5 GHz are being considered for permitting aerial wireless device operations by European regulators in the European Conference of Postal and Telecommunications Administrations (CEPT). The lower frequency bands are of interest because they may offer better coverage to the aerial wireless devices as compared with higher frequency bands. These aerial wireless devices may be operator controlled and may be subject to aeronautical regulations and unmanned traffic management (UTM) system. While there is consideration of operating aerial wireless devices with existing LTE network deployments, aerial wireless devices operating with 5G with advanced antenna systems (AAS) is also being discussed by the 3GPP.

In downlink (DL) transmission (network node to aerial wireless device transmission), the aerial wireless devices receive strong inter-cell interference from the network nodes. While flying in the air, the aerial wireless devices can be served or interfered with by the sidelobes of nearby network nodes. The aerial wireless devices can alternatively be interfered with or served by network nodes which are further away, since the aerial wireless device is near the horizon in the elevation plane where the network node antenna has the maximum gain as seen from the network node. The network node antenna gain towards the aerial wireless devices may also depend on the downtilt of the network node antennas.

For the aerial wireless device uplink (UL) transmission (i.e., aerial wireless device to network node transmission), the interference at the network nodes is much stronger than that from terrestrial wireless devices, which results in a significant degradation of the signal to interference plus noise ratio (SINR). Thus, the interference in a mobile network may have to be managed carefully due to the possible interference. In addition to causing significant interference within the network, these aerial wireless devices are also "visible" to different services which operate in an adjacent spectrum to the spectrum allocated for International Mobile Telecommunication (IMT) systems. These can include systems such as one or more of radars, broadcast spectrum, radiolocation, aeronautical mobiles, fixed and mobile satellite services, radio astronomy, space research, etc.

Some of these services have very sensitive receivers on the ground where an aerial wireless device may be more likely to cause interference to these services. One reason may be that the probability line of sight (LoS) conditions between the aerial wireless device and the sensitive receiver of these systems is larger for the aerial wireless device than for a wireless device on the ground. This in turn means a larger probability for low propagation losses resulting in a higher probability that the aerial wireless device is causing interference.

Restricting the out of band (OOB) radio frequency (RF) emissions from the aerial wireless device may be performed by having better filtering in the aerial wireless devices, or reducing the transmit power used by the wireless device for communicating, or having a sufficient guard band or a combination of these techniques.

However, these restrictions suffer from various issues. For example, one restriction relates to using coordination zones or no-fly zones to limit the operation of aerial wireless devices in a given area. When the locations of the receivers of the systems providing services requiring protection are not known beforehand, it can be difficult to identify the coordination zones. Furthermore, the aerial wireless devices may have to be programmed or instructed to avoid flying in the no-fly zones.

Another example involves the introduction of more stringent out of band (OOB) emission requirements than the requirements defined in the 3GPP standards for the aerial wireless devices by, e.g., filtering. But this restriction may require significant additional monetary cost and/or computational resources cost for the aerial wireless device. Moreover, the aerial wireless device hardware may be limited in form factor and space which limits the design options even if special hardware can be designed for commercial aerial wireless devices.

In another example of a restriction, reducing the power of the aerial wireless device such that the aerial wireless device always operates below a power threshold may have certain drawbacks as the aerial wireless device may lose the coverage of its serving base station due to the reduced transmission power.

SUMMARY

Some embodiments advantageously provide methods, network nodes, and aerial wireless devices for height based power control for aerial wireless devices.

As discussed above, one issue with an aerial wireless device (AWD) flying in the air is that the AWD may cause interference to the receivers of one or more systems providing one or more services in the same channel or in adjacent channels/bands. This problem may at least in part be addressed as described herein by using height specific thresholds to trigger wireless device output power modification mechanisms such as to reduce the output power. In one or more embodiments, this may be performed by using wireless device specific or generic signaling. Based on the height or altitude of the aerial wireless device, the aerial wireless device can determine whether its transmit power may be reduced and may optionally report the power output conformance to the network node, e.g., serving base station.

It is also noted that some additional restrictions may be needed for out of band (OOB) emissions from the aerial wireless devices to protect the receivers of the systems that provide adjacent services. Such restrictions may be in the form of coordination or no-fly zones where the aerial wireless devices are prevented from operating or restricting the radio frequency (RF) emissions from the aerial wireless devices into the adjacent services band.

In one or more embodiments, the aerial wireless device reports its height (e.g., altitude) to the network node when the aerial wireless device crosses a specific height threshold or if a predefined criterion is met. Then the network node signals to the aerial wireless device to reduce its transmit power and/or create a guard band, i.e., to perform one or more actions to reduce the probability of the aerial wireless device causing interference to at least one other entity.

In one or more embodiments, a method is provided to trigger measurement reports to the network node from the aerial wireless device when the aerial wireless device crosses a specific height (e.g., altitude) threshold where the measurement reports may be used by the network node to schedule the aerial wireless device in resource blocks which are away in the frequency domain from the band edge by at least a predefined amount, thereby decreasing the OOB emissions to protect the adjacent services.

In one or more embodiments, the above embodiments may be combined such as, for example, to limit the transmit power in certain resource blocks based at least in part on height reports from the aerial wireless devices.

One or more embodiments described herein provide one or more of the following advantages:

Efficient spectrum usage by avoiding guard bands to protect adjacent services as the aerial wireless device can be scheduled intelligently such as on resources at least a predefined distance, in frequency and/or time, from the resources used by the protected adjacent services.

Help avoid coverage issues by avoiding having to unnecessarily reduce the maximum transmit power from the aerial wireless devices if, for example, an aerial wireless device is below a predefined altitude, thus making the entire band available for aerial wireless devices. Coverage may affect the exchange of command and control information with the aerial wireless devices such as when the aerial wireless devices are below a predefined altitude or in or below the clutter.

Help reduce the need for carrier aggregation or dual connectivity as a single band can be sufficient to serve the aerial wireless device with a desired Quality of Service (QoS).

Less physical resources may be required if and when the aerial wireless device is below the clutter and/or below a predefined altitude to transmit the same amount of data, as the aerial wireless device can transmit at higher transmission powers, allowing the network to schedule other wireless devices.

Helps avoid impact on legacy wireless devices operating in the same band.

According to one aspect, a network node is configured to communicate with an aerial wireless device (AWD). The network node includes a radio interface configured to signal emission control parameter information for modifying a transmission power of the AWD based at least in part on a height, H, of the AWD.

According to this aspect, in some embodiments, the network node further includes processing circuitry in communication with the radio interface, the processing circuitry is configured to determine at least one emission control parameter, the emission control parameter including at least one of a maximum power reduction value and network signaling value, where the emission control parameter information indicating the at least one emission control parameter. In some embodiments, the emission control parameter information indicates one of at least one emission control parameter and a criterion for applying the at least one emission control parameter, the emission control parameter including at least one of a maximum power reduction value and a network signaling value. In some embodiments, the radio interface is further configured to signal a height threshold, Hr, to the AWD. In some embodiments, the processing circuitry is further configured to configure the AWD to control emissions by applying a first emission control parameter when H is greater than Hr and by applying a second emission control when H is not greater than Hr. In some embodiments, the processing circuitry is further configured to configure the AWD to reduce emissions by a first margin when H is greater than Hr and to reduce emissions by a second margin when H is not greater than Hr. In some embodiments, the radio interface is further configured to signal to the AWD a mapping from H to an emissions control parameter, E. In some embodiments, the mapping depends in part on a frequency of operation of the AWD. In some embodiments, the mapping depends in part on a frequency of operation of a victim wireless device interfered with by the AWD. In some embodiments, the mapping assigns a respective emission control parameter En to each successive range between successive height thresholds of N−1 height thresholds, N being an integer greater than 1. In some embodiments, the processing circuitry is further configured to cause a radio interface of the AWD to reduce a transmit power of the AWD in a frequency guard band.

According to another aspect, a method in a network node configured to communicate with an aerial wireless device (AWD) is provided. The method includes signaling emission control parameter information for modifying a transmission power of the AWD based at least in part on a height, H, of the AWD.

According to this aspect, in some embodiments, the method further includes determining at least one emission control parameter, the emission control parameter including at least one of a maximum power reduction value and a network signaling value, the emission control parameter information indicating the at least one emission control parameter. In some embodiments, the emission control parameter information indicates one of at least one emission control parameter and a criterion for applying the at least one emission control parameter, the emission control parameter including at least one of a maximum power reduction value and a network signaling value. In some embodiments, the method also includes sending a height threshold, Hr, to the AWD. In some embodiments, the method further includes configuring the AWD to control emissions by applying a first emission control parameter when H is greater than Hr and by applying a second emission control when H is not greater than Hr. In some embodiments, the method also includes configuring the AWD to reduce emissions by a first margin when H is greater than Hr and to reduce emissions by a second margin when H is not greater than Hr. In some embodiments, the method also includes signaling to the AWD a mapping from H to an emissions control parameter, E. In some embodiments, the mapping depends in part on a frequency of operation of the AWD. In some embodiments, the mapping depends in part on a frequency of operation of a victim wireless device interfered with by the AWD. In some embodiments, the mapping is based on N height thresholds, each of the N height thresholds being associated with a respective emissions control parameter, En, N being an integer greater than 1. In some embodiments, the method further includes configuring the AWD to reduce a transmit power of the AWD in a frequency guard band.

According to yet another aspect, an aerial wireless device, AWD, is configured to communicate with a network node. The AWD includes processing circuitry configured to determine emission control parameter information for modifying a transmission power of the AWD based at least in part on a height, H, of the AWD.

According to this aspect, in some embodiments, determining the emission control parameter information includes receiving emission control parameter information from a network node and/or based on a pre-defined rule. In some embodiments, emission control parameter information depends in part on a frequency of operation of the AWD. In some embodiments, emission control parameter information depends in part on a frequency of operation of a victim wireless device interfered by the AWD. In some embodiments, at least one of the first and second power levels are configured based at least in part on an emission control parameter received from the network node. In some embodiments, the processing circuitry is further configured to control out of band, OOB, emissions based on the emission control parameter. In some embodiments, the AWD further comprises a radio interface to report H to the network node. In some embodiments, the processing circuitry is further configured to determine a height threshold, Hr. In some embodiments, determining the height threshold, Hr, includes receiving the height threshold, Hr from a network node and/or is based on a pre-defined rule. In some embodiments, controlling the out of band, OOB, emissions further includes applying a first emission control parameter when H is greater than Hr and by applying a second emission control parameter when H is not greater than Hr. In some embodiments, controlling the out of band, OOB, emissions further includes reducing the emissions by a first margin when H is greater than Hr and reducing the emissions by a second margin when H is not greater than Hr.

According to another aspect, a method in an aerial wireless device, AWD, configured to communicate with a network node is provided. The method includes determining emission control parameter information for modifying a transmission power of the AWD based at least in part on a height, H, of the AWD.

According to this aspect, in some embodiments, determining the emission control parameter information includes receiving emission control parameter information from a network node and/or based on a pre-defined rule. In some embodiments, emission control parameter information depends in part on a frequency of operation of the AWD. In some embodiments, emission control parameter information depends in part on a frequency of operation of a victim wireless device interfered by the AWD. In some embodiments, at least one of the first and second power levels are configured based at least in part on an emission control parameter received from the network node. In some embodiments, the method further includes controlling out of band, OOB, emissions based on the emission control parameter. In some embodiments, the method includes reporting H to the network node. In some embodiments, the method further includes determining a height threshold, Hr. In some embodiments, determining the height threshold, Hr, includes receiving the height threshold, Hr from a network node and/or based on a pre-defined rule. In some embodiments, controlling the out of band, OOB, emissions further comprising applying a first emission control parameter when H is greater than Hr and by applying a second emission control parameter when H is not greater than Hr. In some embodiments, controlling the out of band, OOB, emissions further comprising reducing the emissions by a first margin when H is greater than Hr and reducing the emissions by a second margin when H is not greater than Hr.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 11 is a flow diagram of another method according to some embodiments of the disclosure; and FIG. 12 is a flow diagram of yet another method according to some embodiments of the disclosure.

DETAILED DESCRIPTION

Figure 1:
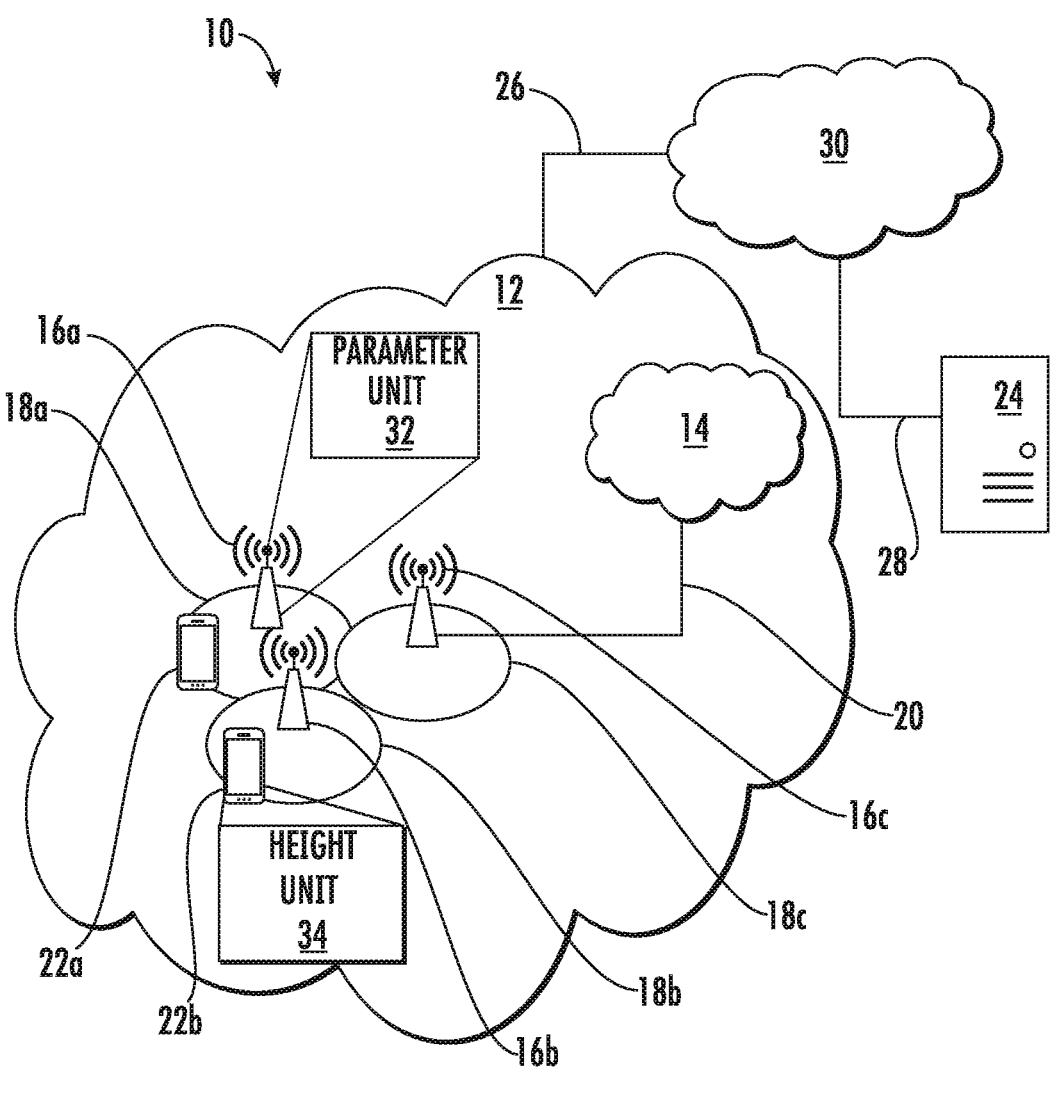
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in combinations of apparatus components and processing steps related to height based power control for aerial wireless devices. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "determine" may be used herein to refer to actual calculation or generation of a result, value, parameter, etc., but an element/device, or that the result, value, parameter, etc., is obtained from another element/device.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), relay, multi-standard radio (MSR) radio node such as MSR BS, eNodeB, gNodeB, network controller, radio network controller (RNC), base station controller (BSC), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may refer to any type of wireless device communicating with a network node and/or with another UE in a cellular or mobile communication system. The wireless device can also be an aerial vehicle, which can be any type of flying object equipped with a wireless device, e.g., a drone. Examples of wireless devices are target device, drone, aircraft, device to device (D2D) WD, machine type WD or WD capable of machine to machine (M2M) communication, PDA, tablet computer, mobile terminals, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the non-limiting term 'node' may be used to refer to a wireless device or a network node.

In some embodiments the non-limiting term 'aerial WD (AWD)' is used to refer to any type of wireless device equipped or housed or located in any type of flying object. The flying object moves or flies in air or in free space. The term flying object is interchangeably referred to as flying vehicle, aerial vehicle (AV), aerial object, aerial device, IAB node, etc. Examples of the flying object are one or more of aircraft, drone, chopper, helicopter, flying balloon, glider, flying bus, etc. In some embodiments aerial vehicle (AV) may also refer to aerial WD (AWD).

In some embodiments, the "network node" can be located on the ground, thus creating air-to-ground communications. In some cases, the "network node" can also be airborne, such as one or more of High Altitude Platform Systems (HAPS), High Altitude Platform Stations as IMT BS (HMS), where the serving network node is located in a flying object, e.g. balloon.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

It is noted that the term "height" is used throughout. Height (H) as used herein refers to the height of the arial wireless device with respect to at least one reference height (Hr). Hr may also be referred to herein as the height threshold. Examples of Hr include, but are not limited to sea level, ground level, ground level at particular location (e.g., in cell1), lowest height at particular location (e.g., in cell1), highest point at particular location (e.g., in cell1), predefined height, height configured by the network node, etc. The term height may also be referred to as altitude, elevation, etc.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide height based power control for aerial wireless devices. Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. In some embodiments, one or more of WDs 22 are aerial vehicles. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a parameter unit 32 and a wireless device 22 is configured to include a height unit 34, as described herein.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to process, determine, relay, forward, signal, store, transmit, receive, etc., information related to height based power control for aerial wireless devices.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include parameter unit 32 configured to perform one or more network node 16 functions as described herein such as with respect to height based power control for aerial wireless devices 22.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a height unit 34 configured to perform one or more wireless device 22 functions as described herein such as with respect to height based power control for aerial wireless devices 22.

Figure 2:
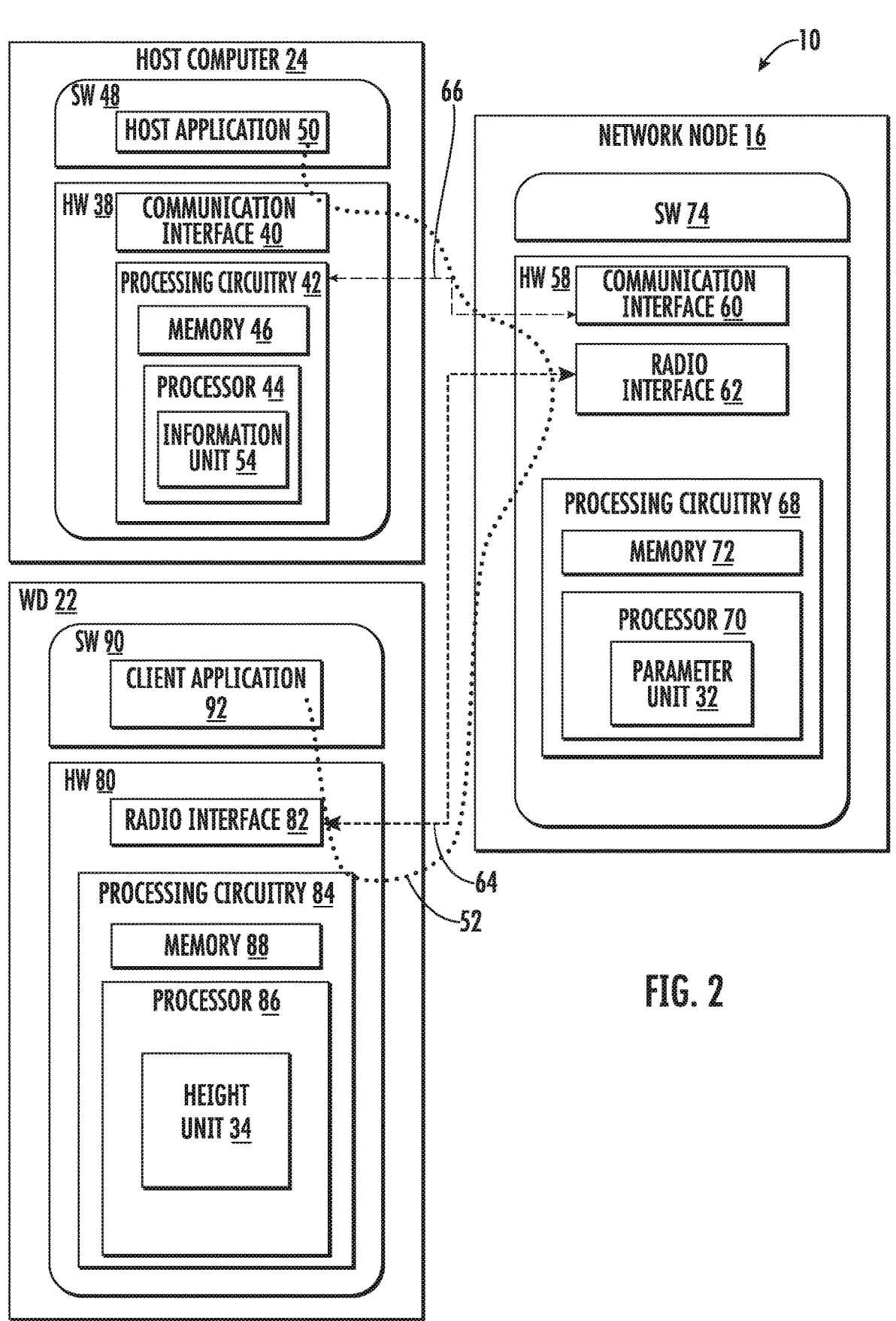
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as parameter unit 32, and height unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 3, 4:
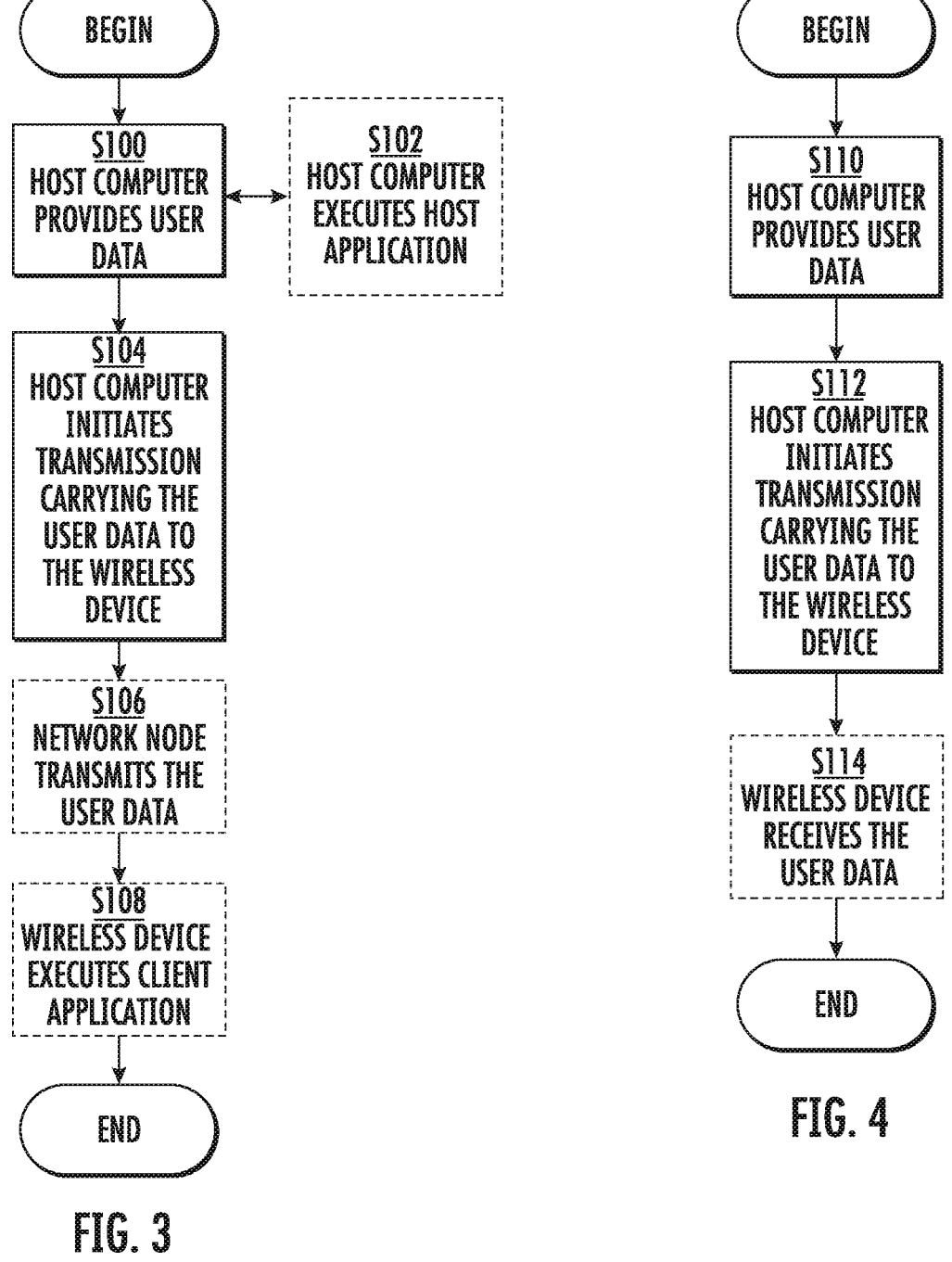
FIG. 3 is a flowchart illustrating exemplary methods implemented in a communication system including a host computer, a network node and a wireless device for executing a client application at a wireless device according to some embodiments of the present disclosure.
FIG. 4 is a flowchart illustrating exemplary methods implemented in a communication system including a host computer, a network node and a wireless device for receiving user data at a wireless device according to some embodiments of the present disclosure.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 5:
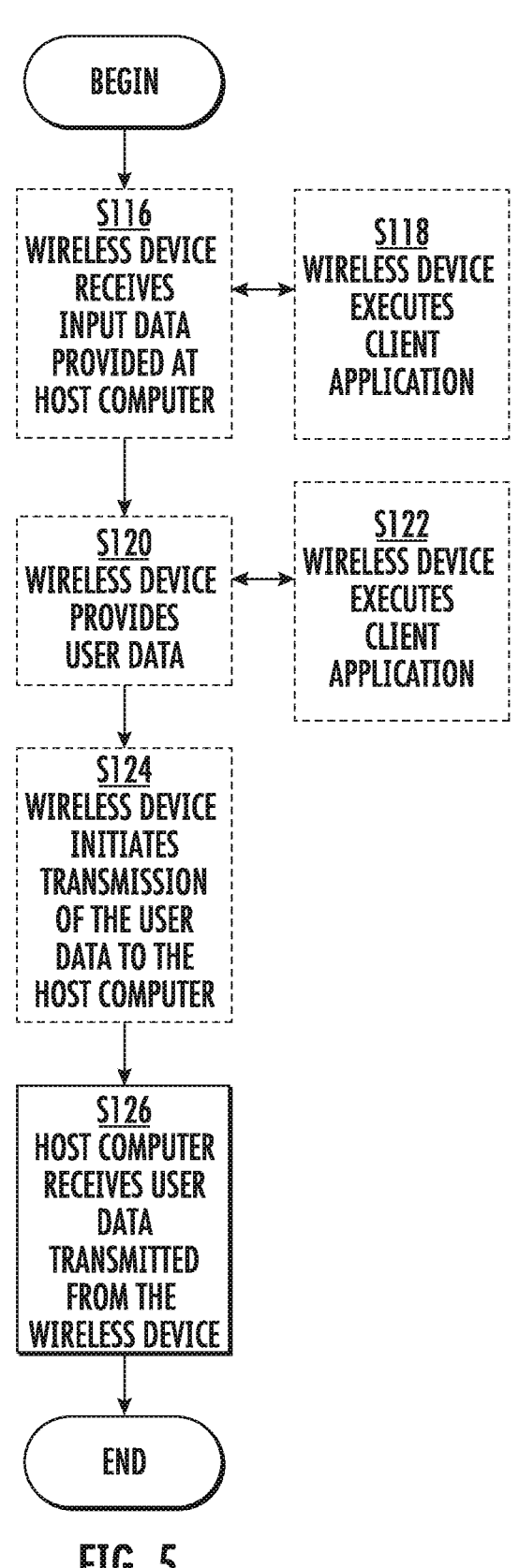
FIG. 5 is a flowchart illustrating exemplary methods implemented in a communication system including a host computer, a network node and a wireless device for receiving user data from the wireless device at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 6:
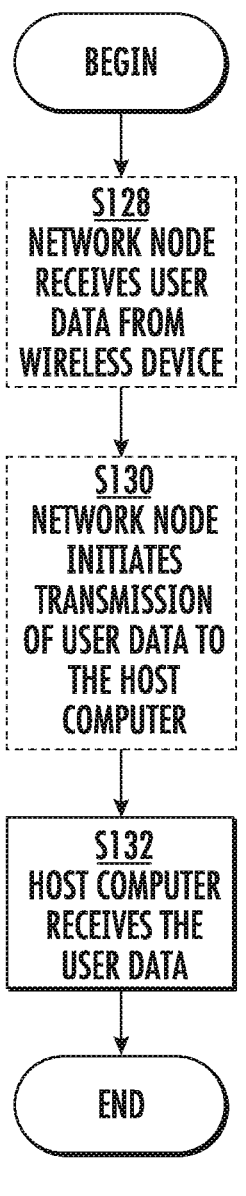
FIG. 6 is a flowchart illustrating exemplary methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
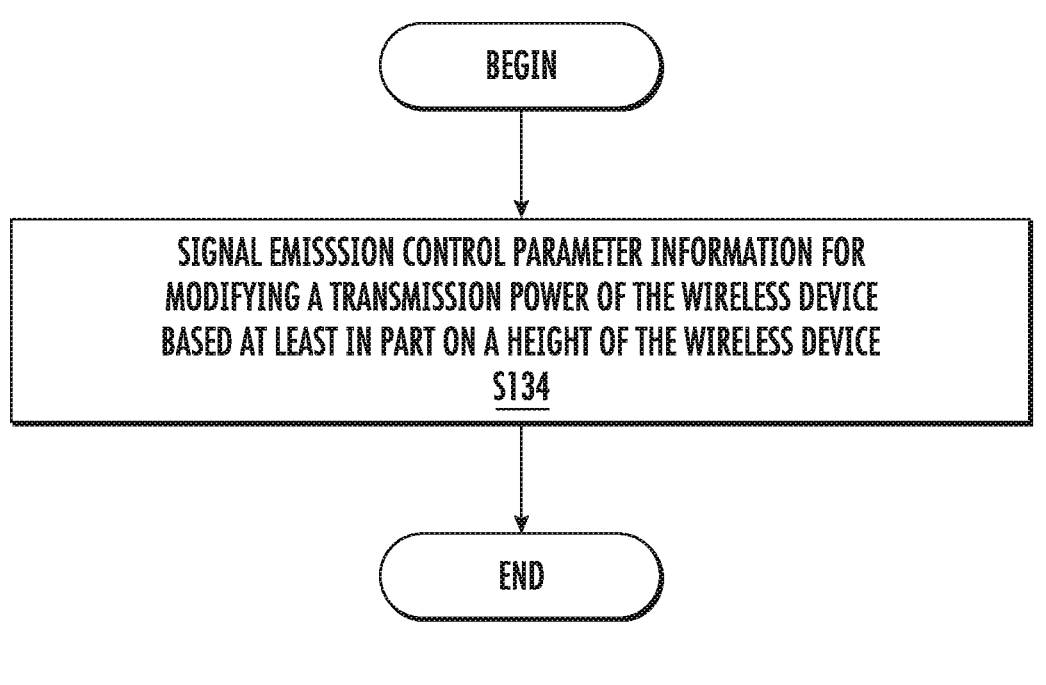
FIG. 7 is a flowchart of an exemplary process in a network node according to some embodiments of the present disclosure.

FIG. 7 is a flowchart of an exemplary process in a network node 16 according to one or more embodiments of the disclosure. One or more blocks and/or functions performed by network node 16 may be performed by one or more elements of network node 16 such as by parameter unit 32 in processing circuitry 68, processor 70, radio interface 62, etc. In one or more embodiments, network node 16 such as via one or more of processing circuitry 68, processor 70, parameter unit 32, communication interface 60 and radio interface 62 is configured to signal (Block S134) emission control parameter information for modifying a transmission power of the wireless device 22 based at least in part on a height of the wireless device 22, as described herein.

According to one or more embodiments, the network node 16 is further configured to, and/or the radio interface 62 and/or processing circuitry 68 is further configured to determine at least one emission control parameter where the emission control parameter includes at least one of a maximum power reduction value and network signaling value. The emission control parameter information indicates the determined at least one emission control parameter. According to one or more embodiments, the emission control parameter information indicates one of at least one emission control parameter and a criterion for applying the at least one emission control parameter where the emission control parameter includes at least one of a maximum power reduction value and network signaling value.

Figure 8:
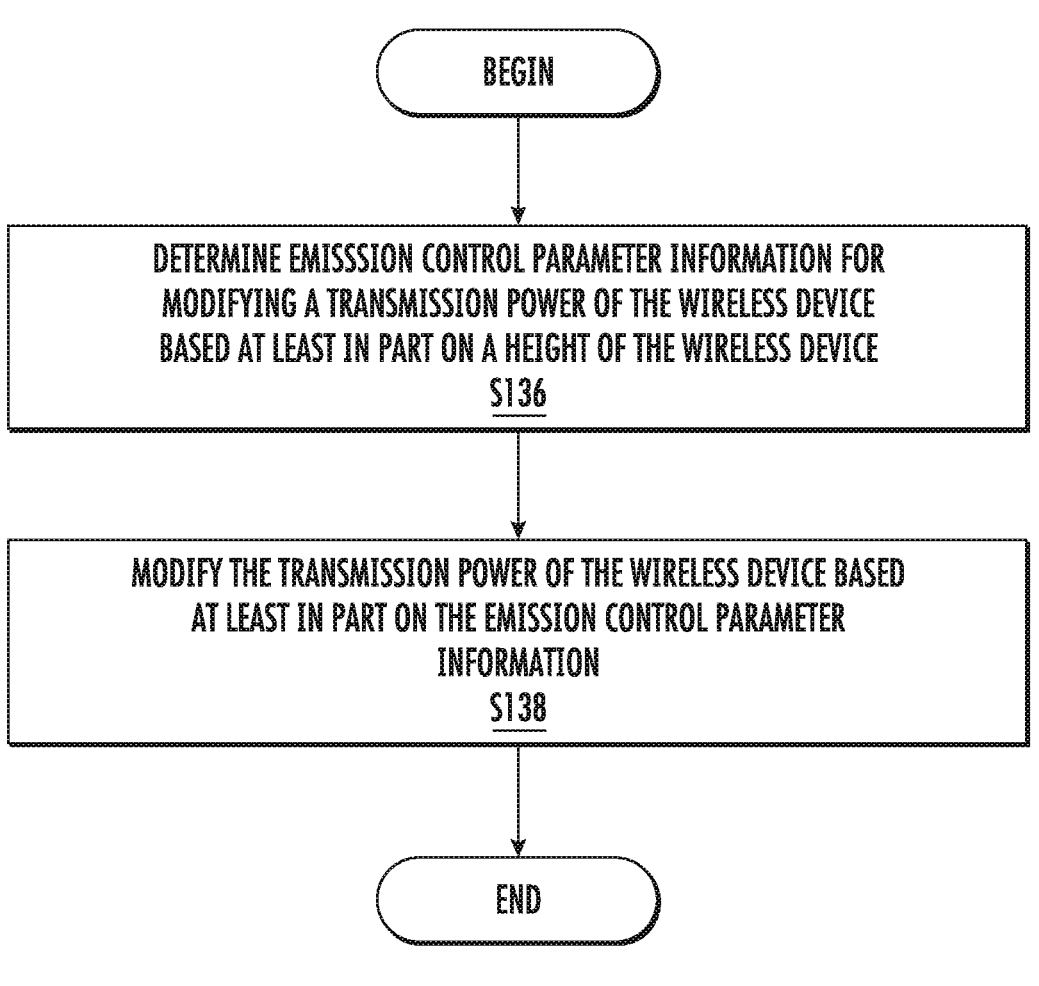
FIG. 8 is a flowchart of an exemplary process in a wireless device according to some embodiments of the present disclosure.

FIG. 8 is a flowchart of an exemplary process in a wireless device 22 according to some embodiments of the present disclosure. One or more blocks and/or functions performed by wireless device 22 may be performed by one or more elements of wireless device 22 such as by height unit 34 in processing circuitry 84, processor 86, radio interface 82, etc. In one or more embodiments, wireless device such as via one or more of processing circuitry 84, processor 86, height unit 34 and radio interface 82 is configured to receive (Block S136) emission control parameter information for modifying a transmission power of the wireless device 22 based at least in part on a height of the wireless device 22, as described herein. In one or more embodiments, wireless device such as via one or more of processing circuitry 84, processor 86, height unit 34 and radio interface 82 is configured to modify (Block S138) the transmission power of the wireless device based at least in part on the emission control parameter information, as described herein.

According to one or more embodiments, the emission control parameter information indicates at least one emission control parameter including at least one of a maximum power reduction value and network signaling value. According to one or more embodiments, the wireless device 22 is further configured to, and/or the radio interface 82 and/or processing circuitry 84 is further configured to determine at least one emission control parameter, the emission control parameter including at least one of a maximum power reduction value and network signaling value, the emission control parameter information indicating a criterion for applying the at least one emission control parameter.

While the examples described herein use height of the AWD 22 for making power control decisions/determinations, one or more other physical and/or motion and/or movement based characteristics of the AWD 22 within a space may be used for performing power control such as one or more velocity, direction, vector direction, etc.

Having generally described arrangements for height based power control for aerial wireless devices 22, details for these arrangements, functions and processes are provided as follows, and which may be implemented by the network node 16, an aerial wireless device (AWD) 22 and/or host computer 24.

Embodiments provide height based power control for aerial wireless devices 22.

Example Scenario

The example scenario includes at least one aerial wireless device 22 (AWD) 22 (which can be any flying object and may also correspond to a drone network node 16). The AWD 22 is served by a first cell (cell1) over a certain bandwidth (BW1) on a first carrier frequency (F1). BW1 may be equal to or smaller than the bandwidth of the carrier F1. The AWD 22 may be served over all or part of BW1. A cell denoted herein as cell 1 in turn may be served or managed by a network node 16 (e.g., a base station). The AWD 22, such as via one or more of processing circuitry 84, processor 86, radio interface 82, height unit 34, etc., may further be capable of operating on signals from one or more additional cells, e.g., a second (cell2) during cell change or during multicarrier operation. The term "operating on signals" includes at least receiving a signal from and/or transmitting a signal to the network node 16.

The AWD 22, such as via one or more of processing circuitry 84, processor 86, radio interface 82, height unit 34, etc., may cause radio emissions in the frequencies other than the frequency in which the AWD 22 is served by cell1. For example, the radio emissions may occur outside the AWD 22's operating bandwidth or outside F 1. Such radio emissions may also be referred to as out of band (OOB) emissions. The OOB emission requirements may be met by a radio node (e.g., AWD 22) to protect or limit interference towards other devices operating using adjacent carriers or bands. Examples of performance metrics or measures or criteria defining OOB emissions include one or more of Adjacent Channel Leakage Ratio (ACLR), Spectrum Emission Mask (SEM), Spurious emissions, unwanted emissions, additional spurious emission, etc. As used herein, the term "emission" may refer to any type of radio emissions, including any type of OOB emissions, etc.

Some Examples

According to at least one concept of the disclosure, an AWD 22 such as via one or more of processing circuitry 84, processor 86, radio interface 82, height unit 34, etc., applies and/or implements an emission control parameter based at least on the height (H) (e.g., altitude, altitude relative to a point (e.g., ground, location, etc.)) of the AWD 22 with respect to at least one reference height (Hr), i.e., predefined height or predefined criterion. Hr may also be referred to as a height threshold. Examples of Hr may include one or more of sea level, ground level, ground level at a particular location (e.g., in cell1), lowest height at a particular location (e.g., in cell1), highest point at a particular location (e.g. in cell1), pre-defined height, height configured by the network node 16, etc. The term height may also correspond to altitude, elevation, etc.

The relationship between at least one emission control parameter and the height of the AWD 22 may be defined according to one or more rules (e.g., criteria or criterion). In one or more embodiments, the rule can be expressed in terms of a mapping function which can be defined in terms of one or more of a table, an expression or equation, etc. One or more examples of the mapping function are described below.

The emission control parameter allows for the AWD 22 such as via one or more of processing circuitry 84, processor 86, radio interface 82, height unit 34, etc., to reduce its radio emissions (i.e., 'emissions') towards other devices, e.g., in frequencies outside the operating bandwidth of the AWD 22. In one example, the emission control parameter is configured to reduce emissions on a carrier frequency adjacent to or in proximity to F1 in the frequency domain. In another example, the emission control parameter is configured to reduce emissions in a plurality of carrier frequencies or range of frequencies outside the AWD 22's operating bandwidth so as to exclude the serving carrier frequency (F1). In yet another example, the emission control parameter is configured to reduce emissions in a plurality of carrier frequencies or range of frequencies outside the AWD 22's operating band which contains the AWD/s operating carrier frequency (F1).

In yet another example, the emission control parameter is configured to reduce emissions in one or more bands adjacent to the AWD 22's operating band which contains its operating carrier frequency (F1). For example, the reduction in emission provided by implementing the emission control may include a reduction in the power of radio emissions outside F1 below a certain threshold, e.g., below Y1 dBm. The emission control parameter may therefore require the aerial wireless device 22 such as via one or more of processing circuitry 84, processor 86, radio interface 82, height unit 34, etc., to reduce the aerial wireless device 22's transmit power by a certain margin and/or avoid or minimize transmission of signals in one or more radio resources within its bandwidth. Therefore, one or more emission control parameters may be configured to enable the aerial wireless device 22 such as via one or more of processing circuitry 84, processor 86, radio interface 82, height unit 34, etc., to achieve or fulfill certain OOB emission requirement(s) to protect other devices from unwanted interference that may be caused by wireless device 22. In one example, the AWD 22's such as via one or more of processing circuitry 84, processor 86, radio interface 82, height unit 34, etc., reduces emissions by a larger margin when its height (H) is above threshold (Hr) compared to the situation when the aerial wireless device's height is below the threshold, i.e., H≤Hr. In another example, the AWD reduces emissions by a larger margin when its height (H) is below the threshold (Hr) as compared to the margin of emission reduction by the AWD 22 when H≥Hr.

An emission control parameter can be pre-defined (i.e., preconfigured in the AWD 22) and/or it can be signaled to the aerial wireless device 22 by the network node 16 such as via one or more of processing circuitry 68, processor 70, radio interface 62, parameter unit 32, etc., (e.g., in a wireless device-specific message and/or in system information transmitted by the network node 16 over a broadcast channel). Examples of the radio resources include one or more of a physical channel, a resource element, a resource block (RB), part of bandwidth, etc. Examples of such emission control parameters may include one or more of a maximum power reduction (MRP), an additional MRP (A-MRP), a network signaling (NS) value, etc. For example, upon receiving an NS value (e.g., NS=X1), the aerial wireless device 22 may apply A-MPR in order to meet certain pre-defined additional spurious emission requirements. This can be accomplished by the aerial wireless device 22 by reducing the aerial wireless device 22 maximum output power by X2 dB (e.g., from 23 dBm to 20 dBm where X2=3 dB) and/or not transmitting over X3 a number of resource blocks (RBs), etc., such as may be dictated by one or more emission control parameters.

In one example, emission control parameter (E) is determined such as via one or more of processing circuitry 68, processor 70, radio interface 62, parameter unit 32, etc., or such as via one or more of processing circuitry 84, processor 86, radio interface 82, height unit 34, etc., by a rule that is based at least in part on a relationship between the AWD 22 height (H) with respect to the height threshold Hr according to the following general expression (1):

$$E=f(H,Hr) \tag{1}$$

In (1), E can have one or more values. Furthermore, there can be one or more reference height values, Hrn.

The relationship may further depend on a frequency (Fa) of operation of the AWD 22, which is an aggressor since aerial wireless device 22 may be causing interference to other devices. For example, different values of E and/or Hr can be defined for different frequency ranges or frequency bands in which the AWD 22 operates. This is expressed by (2):

$$E=f(H,Hr,Fa) \tag{2}$$

The relationship may further depend on the frequency (Fv) of operation of the victim system, e.g., a ground based satellite receiver, etc. For example, different values of E and/or Hr can be defined for different frequency ranges or frequency bands in which the AWD 22 operates, and also for different frequency ranges or frequency bands in which the victim system operates. This is expressed by (3):

$$E=f(H,Hr,Fa,Fv) \tag{3}$$

Figure 9:
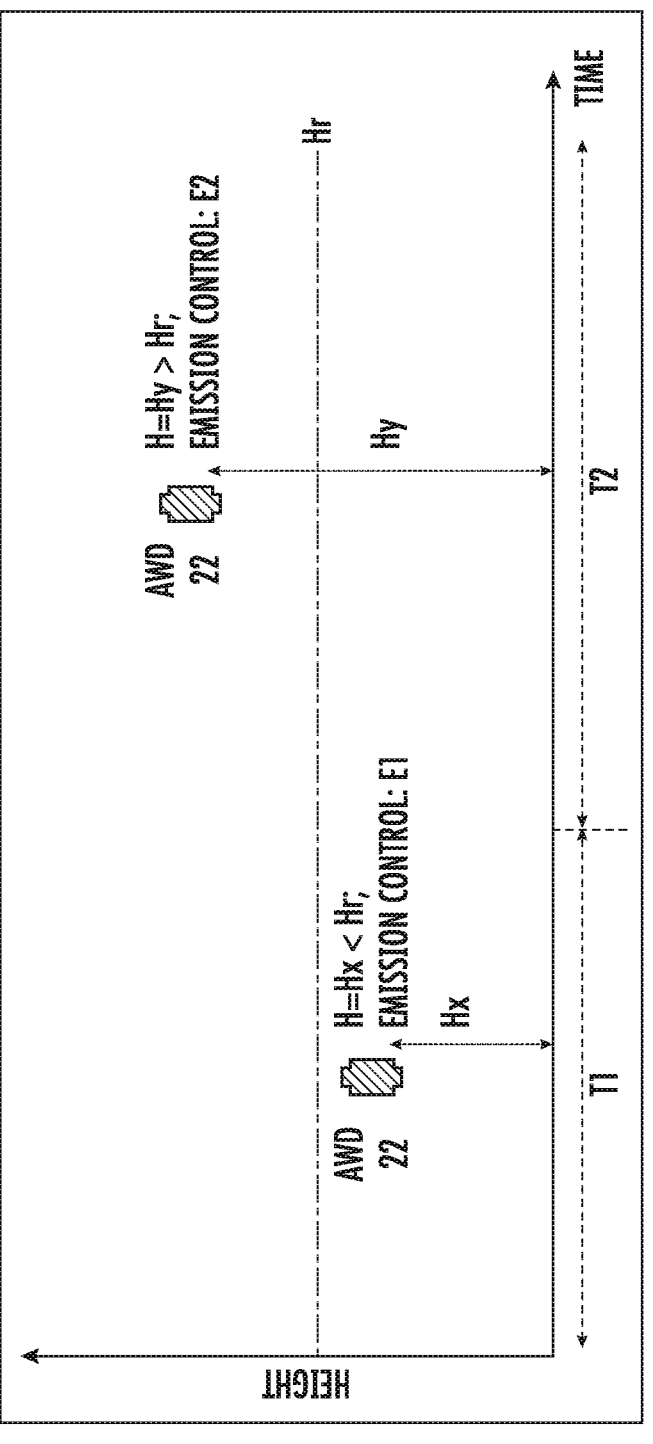
FIG. 9 is a diagram of an example of AWD location at different heights and various associated emission control parameters according to some embodiments of the disclosure.

FIG. 9 is a diagram of an example illustrating AWD 22 location at different heights (H) and the application of associated emission control parameters. In FIG. 9, the height of AWD 22 during time T1 is Hx, which is below Hr. During T1 the AWD 22 applies a first emission control parameter, E1, to meet the GOB emission requirements and/or to meet at least one emission criterion. During T2, the AWD 22 height increases to Hy which is larger than Hr. Therefore, during T2, the AWD 22 applies a second emission control parameter, E2, to meet the OOB emission requirements. In some embodiments, the emission control parameter E2 is configured to cause the AWD 22 to reduce the emissions by a larger margin than the reduction of emissions by applying the emission control parameter E1. In some embodiments, the emission control parameter E1 indicates an AWD transmit power that is greater than the AWD transmit power indicated by the emission control parameter E2.

The relationship between the emission control parameter (s) and the AWD 22's will be better understood by reference to the example embodiments disclosed below:

The example in Table 1 illustrates that the AWD 22 applies the emission control parameter, E1, when its height, H, is less than or equal to Hr, while it applies the emission control parameter, E2, when H>Hr. E1 and E2 are different from each other. As an example, E2 may require the aerial wireless device 22 to reduce the emission by a larger margin when compared to E1.

TABLE 1

| A general example of relation between the AWD 22's height and emission control parameter | | | |
|---|---|---|---|
| Case | AWD height with respect to reference height | Conditions | Emission control parameter value (E) |
| 1 | H | H ≤ Hr | E1 |
| 2 | H | H > Hr | E2; E1 ≠ E2 |

The example in Table 2 is similar to that in Table 1 except that, in Table 2 there are N possible emission control parameters (E1, E2, . . . , EN)) and (N–1) possible height threshold values (Hr1, Hr2, . . . , HrN–1). The AWD 22, such as via one or more of processing circuitry 84, processor 86, radio interface 82, height unit 34, etc., may apply the emission control parameter that is associated with the corresponding range of heights, e.g., E2 when H is between Hr1 and Hr2, etc.

TABLE 2

| A general example of a relation between the AWD 22's height and emission control parameter | | | |
|---|---|---|---|
| Case | AWD height with respect to reference height | Conditions | Emission control parameter value (E) |
| 1 | H | H ≤ Hr1 | E1 |
| 2 | H | Hr1 < H ≤ Hr2 | E2 |
| . . . | . . . | . . . | . . . |
| N | H | H > Hr$_{N-1}$ | E$_N$ |

The example in Table 3 is similar to that in Table 1 except that in Table 3 the AWD 22 is not required to apply an emission control when H≤Hr but may apply an emission control (based on E2) when H>Hr. In other words, in this example, the transmission power of the AWD 22 is not reduced or increased when the AWD 22 is below the height threshold Hr. but is only reduced when the AWD 2 is above the threshold Hr.

TABLE 3

| A general example of a relation between the AWD 22's height and emission control parameter | | | |
|---|---|---|---|
| Case | AWD height with respect to reference height | Conditions | Emission control parameter |
| 1 | H | H ≤ Hr | No emission control |
| 2 | H | H > Hr | E2 |

The example in Table 4 is similar to that in Table 1 except that, in Table 4 the AWD 22 is not required to apply an emission control when H≥Hr but does apply the emission control (based on E1) when H<Hr. In other words, in this example, the transmission power of the AWD 22 is increased when the AWD 22 is below the height threshold Hr. but is not reduced or increased when the AWD 22 is above the threshold Hr.

TABLE 4

| | A general example of a relation between the AWD 22's height and emission control parameter | | |
|---|---|---|---|
| Case | AWD height with respect to reference height | Conditions | Emission control parameter |
| 1 | H | H ≤ Hr | E1 |
| 2 | H | H > Hr | No emission control |

Table 5 illustrates an example where a network signaling (NS) value is used to signal a specific type of emission control parameter. The NS value further corresponds to certain additional maximum power reduction (A-MPR). As an example, when H $ Hr, then the NS is equal to X11 and the corresponding A-MPR is X21. But when H>Hr, then the NS is equal to X12 and the corresponding A-MPR is X22. As an example, X11=0 and the A-MPR of X21=0 dB; X21>0 and the A-MPR of X22>0 dB (e.g. 3 dB).

TABLE 5

| | A specific example of a relation between the AWD 22's height and emission control parameter | | | |
|---|---|---|---|---|
| Case | AWD height with respect to reference height | Conditions | NS value | Emission control A-MPR (dB) |
| 1 | H | H ≤ Hr | X11 | X21 |
| 2 | H | H > Hr | X12 | X22 |

In order to reduce OOB emissions, one or more embodiments described herein may be implemented, for example, in at least two different ways:

1. Implemented in an aerial wireless device 22 based on network signaling; and
2. Implemented in a network node 16.

Method 1: Implemented in an Aerial Wireless Device 22 Such as Via One or More of Processing Circuitry 84, Processor 86, Radio Interface 82, Height Unit 34, Etc., Based on Network Signaling According to this method, the network node 16 such as via one or more of processing circuitry 68, processor 70, radio interface 62, parameter unit 32, etc., signals emission control parameter information such as a relationship or mapping or association between an emission control parameter and the height threshold (Hr) to the AWD 22. The network node 16 such as via one or more of processing circuitry 68, processor 70, radio interface 62, parameter unit 32, etc., can configure the AWD 22 with any of the relationships, mapping or associations described in any of the examples herein.

The AWD 22 such as via one or more of processing circuitry 84, processor 86, radio interface 82, height unit 34, etc., determines its height and compares it with a threshold (Hr) and then determines the emission control parameter for controlling the OOB emissions according to requirements such as, e.g., reducing OOB emissions, meeting OOB emission requirements. For example, if the AWD 22's height H is above Hr, then aerial wireless device 22 such as via one or more of processing circuitry 84, processor 86, radio interface 82, height unit 34, etc., may apply the emission control based on E2; otherwise aerial wireless device 22 may apply the emission control based on E1.

The AWD 22 such as via one or more of processing circuitry 84, processor 86, radio interface 82, height unit 34, etc., may determine AWD height by, for example, using one or more positioning techniques and/or based at least in part on information received from another node 16, wireless device 22 and/or other entity in system 10. Examples of techniques for determining height include:

using the Global Navigation Satellite System (GNSS) receiver in the aerial wireless device 22;

using an Assisted-GNSS (A-GNSS) receiver in the aerial wireless device 22;

using one or more non-GNSS positioning techniques, e.g., enhanced cell identification (ID), observed time difference of arrival (OTDOA), uplink time difference of arrival (UTDOA), etc.;

using a combination of positioning techniques;

basing the height of the AWD on the height of the aerial vehicle housing the AWD 22. For example, the AWD 22 such as via one or more of processing circuitry 84, processor 86, radio interface 82, height unit 34, etc., may receive information about height of AWD 22 and derive H from the received information about the height. In one example, the AWD 22 may assume that H is equal to the height of AWD 22's housing. In another example, the AWD 22 such as via one or more of processing circuitry 84, processor 86, radio interface 82, height unit 34, etc., may derive its height by using a pre-defined mapping between AWD 22 height and the height of the aerial vehicle housing the AWD 22; and/or receiving parameter H from another node (e.g., another WD 22 capable of device to device (D2D) operation or a serving network node 16 determining AWD 22 height, etc.).

In yet another implementation example, the relationship between the emission control parameter and the height threshold can be pre-defined. In one example, the relationship can be expressed by a particular mapping table or function. In another example, the relationship can be expressed by a plurality of mapping tables or functions. The network node 16 such as via one or more of processing circuitry 68, processor 70, radio interface 62, parameter unit 32, etc., may configure the emission control parameter information such that the AWD 22 can determine whether to apply the emission control parameter. If a plurality of the mapping tables or functions are pre-defined then the network node 16 such as via one or more of processing circuitry 68, processor 70, radio interface 62, parameter unit 32, etc., may also configure the AWD 22 with an identifier of the mapping table or function to be used by the AWD 22 for applying the emission control based on its height with respect to the height threshold. One or more of the mapping tables, functions and identifier(s) may be included as emission control parameter information.

Figure 10:
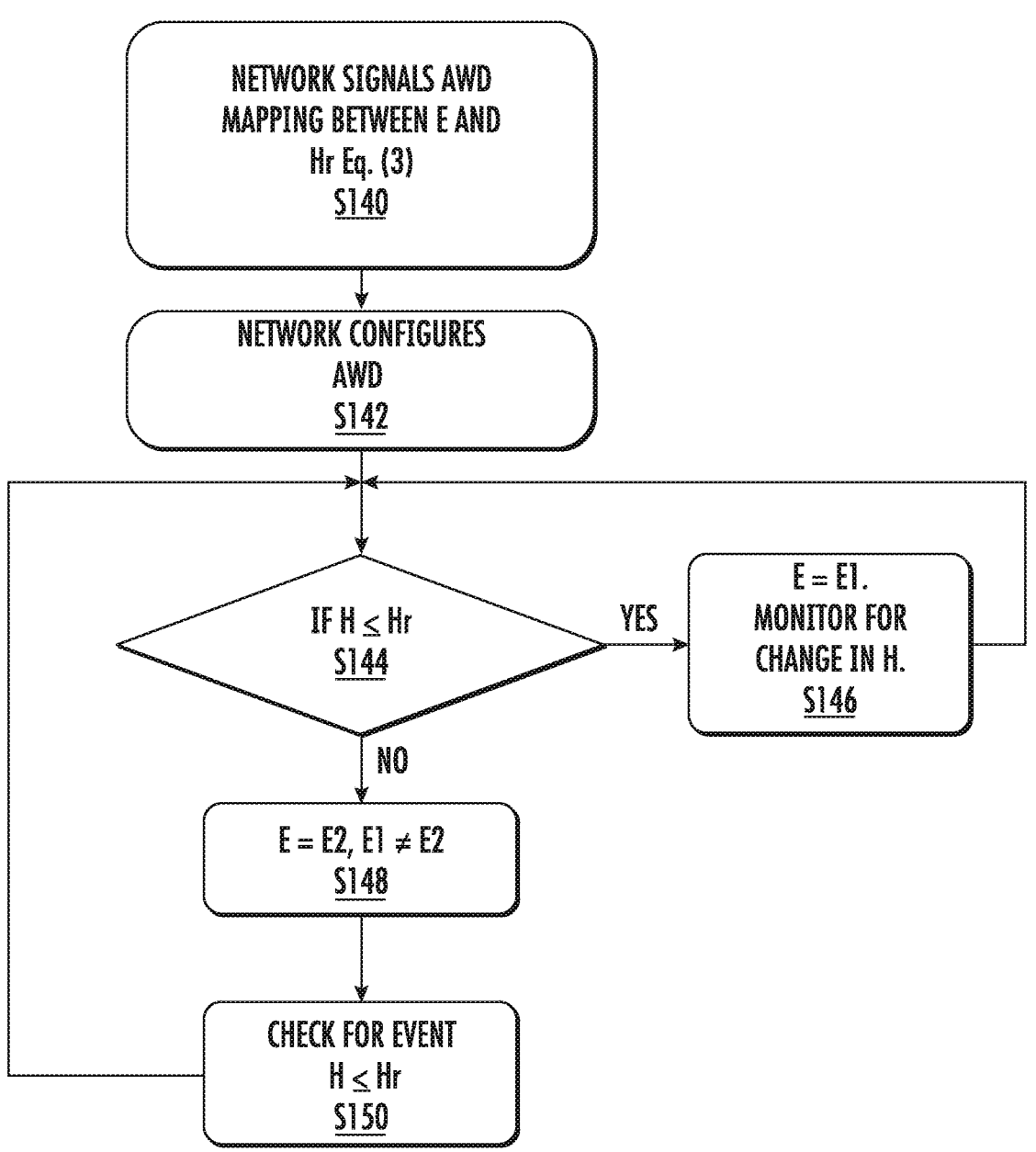
FIG. 10 is a flow diagram of a method according to some embodiments of the disclosure.

FIG. 10 is a flowchart of method 1 that may be implemented by the AWD 22 and/or network node 16. According to this example method, the network node 16 signals (Block S140) a mapping between an emission control parameter E and a height threshold Hr, such as the mapping given by (3). The network node 16 also configures (Block S142) the WD to be responsive to the emission control parameter and threshold Hr according to the mapping. Upon receipt of the emission control parameter E, height threshold Hr and an indication of the mapping, the AWD 22 determines (Block S144) if the height H of the AWD 22 with respect to some reference height exceeds the height threshold Hr. If the height H of the AWD 22 is above the height threshold Hr, then the AWD 22 determines (Block S146) the emission control parameter for controlling the AWD's OOB requirements, in this case E1. Otherwise, the emission control parameter used by the AWD 22 to control the AWD's OOB requirements is E2 not equal to E1 (Block S148). Subsequently, the AWD 22 continues to monitor (Block S150) for the event of H being less than Hr.

Method 2: Implemented at Least in Part in a Network Node 16 Such as Via One or More of Processing Circuitry 68, Processor 70, Radio Interface 62, Parameter Unit 32, Etc.

According to this method, the network node 16 such as via one or more of processing circuitry 68, processor 70, radio interface 62, parameter unit 32, etc., determines the AWD 22 height, compares it with height threshold (Hr) and determines the emission control parameter value to implement. The determination can be based at least in part on any of the principles or examples of the mapping function or relations described herein. The network node 16 such as via one or more of processing circuitry 68, processor 70, radio interface 62, parameter unit 32, etc., then signals information (i.e., emission control parameter information) related to the emission control parameter (e.g., A-MPR value) to the AWD 22. The AWD 22 such as via one or more of processing circuitry 84, processor 86, radio interface 82, height unit 34, etc., is then configured to apply the received emission control parameter value to meet the OOB emission requirement to protect the victim system. In yet another example, in order to reduce the emissions towards the victim system (e.g., in adjacent bands), the network node 16 such as via one or more of processing circuitry 68, processor 70, radio interface 62, parameter unit 32, etc., allocates uplink resources for AWD 22 transmission such that the OOB emissions in the victim system are reduced below and/or to an acceptable level (i.e., a predefined level). For example, AWD 22 may be allocated fewer uplink (UL) resources or no UL resources at all in certain parts of the AWD 22 BW such as to create a guard band, etc. In yet another example, in order to reduce the emissions towards the victim system (e.g., in adjacent bands), the network node 16 may configure the maximum output power of the AWD 22 below a certain/predefined threshold such that the GOB emissions in the victim system are reduced below and/or to an acceptable level, i.e., a predefined level.

In one example, the network node 16 such as via one or more of processing circuitry 68, processor 70, radio interface 62, parameter unit 32, etc., autonomously determines the height of the AWD 22, e.g., based on positioning techniques as described herein. In another example, the AWD 22 is configured to transmit height-based measurement reports to the network node 16. The AWD 22 may be configured to report its height periodically or in response to a trigger or a triggering event. Examples of event triggered reporting of the AWD 22 height may include one or more of:

Event H1: The AWD 22 height is above a threshold; and/or

Event H2: The AWD 22 height is below a threshold.

FIG. 11 a flow chart of one example of method 2 that may be implemented by AWD 22 and/or network node 16. The method of FIG. 11 may be performed at least in part by the network node 16, including the radio interface 62 and the processing circuitry 68. The method of FIG. 11 may also be performed at least in part by a WD 22, include the radio interface 82 and the processing circuitry 84. The method includes determining (Block S152) the height of the AWD 22 and determining the emission control parameter E based on (3). This value of E is signaled (Block S154) to the AWD 22. The network node 16 allocates (Block A56) uplink resources to the AWD 22 and/or a maximum transmit power to the AWD 22.

FIG. 12 is another flow chart of another example of method 2 that may be implemented by AWD 22 and/or network node 16. The method of FIG. 12 may be performed at least in part by the network node 16, including the radio interface 62 and the processing circuitry 68. The method of FIG. 11 may also be performed at least in part by a WD 22, including the radio interface 82 and the processing circuitry 84. The method includes Blocks S158, S160 and S162, which are the same as Blocks S152, S154 and S156, respectively. At Block S164, the network node 16 and/or the AWD 22 determines whether the AWD 22 height is less than the threshold Hr. If the AWD 22 height, H is less than the threshold Hr, the network node 16 and/or the AWD 22 monitors (Block S166) for the first event H1 and the network node 16 configures the AWD 22 with the emission control parameter E1. If the AWD height is not less than S164, then the network node 16 and/or AWD 22 determines (Block S168) that the first event H1 has been triggered. Then the network node 16 configures (Block S168) the emission control parameter to E2 and the WD 22 monitors (Block S168) for a second event H2.

According to one aspect, a network node 16 is configured to communicate with an aerial wireless device (AWD) 22. The network node 16 includes a radio interface 62 configured to signal emission control parameter information for modifying a transmission power of the AWD 22 based at least in part on a height, H, of the AWD 22.

According to this aspect, in some embodiments, the network node 16 further includes processing circuitry 68 in communication with the radio interface, the processing circuitry being configured to determine at least one emission control parameter, the emission control parameter including at least one of a maximum power reduction value and network signaling value, where the emission control parameter information indicating the at least one emission control parameter. In some embodiments, the emission control parameter information indicates one of at least one emission control parameter and a criterion for applying the at least one emission control parameter, the emission control parameter including at least one of a maximum power reduction value and a network signaling value. In some embodiments, the radio interface 62 is further configured to signal a height threshold, Hr, to the AWD 22. In some embodiments, the processing circuitry is further configured to configure the AWD (22) to control emissions by applying a first emission control parameter when H is greater than Hr and by applying a second emission control when H is not greater than Hr. In some embodiments, the processing circuitry 68 is further configured to configure the AWD 22 to reduce emissions by a first margin when H is greater than Hr and to reduce emissions by a second margin when H is not greater than Hr. In some embodiments, the radio interface 62 is further configured to signal to the AWD 22 a mapping from H to an emissions control parameter, E. In some embodiments, the mapping depends in part on a frequency of operation of the AWD 22. In some embodiments, the mapping depends in part on a frequency of operation of a victim wireless device interfered with by the AWD 22. In some embodiments, the mapping is based on N height thresholds, each of the N height thresholds being associated with a respective emissions control parameter En, N being an integer greater than 1. In some embodiments, the mapping assigns a respective emission control parameter En to each successive range between successive height thresholds of N−1 height thresholds, N being an integer greater than 1. In some embodiments, the processing circuitry 68 is further configured to cause a radio interface of the AWD 22 to reduce a transmit power of the AWD 22 in a frequency guard band.

According to another aspect, a method in a network node 16 configured to communicate with an aerial wireless device (AWD) 22 is provided. The method includes signaling, via the radio interface 62, emission control parameter information for modifying a transmission power of the AWD 22 based at least in part on a height, H, of the AWD 22.

According to this aspect, in some embodiments, the method further includes determining, via the processing circuitry 68, at least one emission control parameter, the emission control parameter including at least one of a maximum power reduction value and a network signaling value, the emission control parameter information indicating the at least one emission control parameter. In some embodiments, the emission control parameter information indicates one of at least one emission control parameter and a criterion for applying the at least one emission control parameter, the emission control parameter including at least one of a maximum power reduction value and a network signaling value. In some embodiments, the method also includes sending, via the radio interface 62, a height threshold, Hr, to the AWD 22. In some embodiments, the method further comprises configuring the AWD 22 to control emissions by applying a first emission control parameter when H is greater than Hr and by applying a second emission control when H is not greater than Hr. In some embodiments, the method also includes configuring, via the radio interface 62 and processing circuitry 68, the AWD 22 to reduce emissions by a first margin when H is greater than Hr and to reduce emissions by a second margin when H is not greater than Hr. In some embodiments, the method also includes signaling, via the radio interface 62, to the AWD 22 a mapping from H to an emissions control parameter, E. In some embodiments, the mapping depends in part on a frequency of operation of the AWD 22. In some embodiments, the mapping depends in part on a frequency of operation of a victim wireless device interfered with by the AWD 22. In some embodiments, the mapping assigns a respective emission control parameter En to each successive range between successive height thresholds of N–1 height thresholds, N being an integer greater than 1. In some embodiments, the method further includes configuring, via the radio interface 62 and the processing circuitry 68, the AWD 22 to reduce a transmit power of the AWD 22 in a frequency guard band.

According to yet another aspect, an aerial wireless device, AWD 22, is configured to communicate with a network node 16. The AWD 22 includes processing circuitry 84 configured to determine emission control parameter information for modifying a transmission power of the AWD (22) based at least in part on a height, H, of the AWD (22).

According to this aspect, in some embodiments, determining the emission control parameter information includes receiving emission control parameter information from a network node and/or based on a pre-defined rule. In some embodiments, emission control parameter information depends in part on a frequency of operation of the AWD 22. In some embodiments, emission control parameter information depends in part on a frequency of operation of a victim wireless device interfered by the AWD 22. In some embodiments, at least one of the first and second power levels are configured based at least in part on an emission control parameter received from the network node 16. In some embodiments, the processing circuitry 84 is further configured to control out of band, OOB, emissions based on the emission control parameter. In some embodiments, the AWD 22 further comprises a radio interface 82 to report H to the network node 16. In some embodiments, the processing circuitry 84 is further configured to determine a height threshold, Hr. In some embodiments, determining the height threshold, Hr, includes receiving the height threshold, Hr from a network node and/or is based on a pre-defined rule. In some embodiments, controlling the out of band, OOB, emissions further includes applying a first emission control parameter when H is greater than Hr and by applying a second emission control parameter when H is not greater than Hr. In some embodiments, controlling the out of band, OOB, emissions further includes reducing the emissions by a first margin when H is greater than Hr and reducing the emissions by a second margin when H is not greater than Hr.

According to another aspect, a method in an aerial wireless device, AWD, 22 configured to communicate with a network node 16 is provided. The method includes: determining emission control parameter information for modifying a transmission power of the AWD (22) based at least in part on a height, H, of the AWD (22).

According to this aspect, in some embodiments, determining the emission control parameter information includes receiving emission control parameter information from a network node and/or based on a pre-defined rule. In some embodiments, emission control parameter information depends in part on a frequency of operation of the AWD 22. In some embodiments, emission control parameter information depends in part on a frequency of operation of a victim wireless device interfered by the AWD 22. In some embodiments, the first and second power levels are configured based at least in part on an emission control parameter received from the network node 16. In some embodiments, the method further includes controlling, via the processing circuitry 84, out of band, OOB, emissions based on the emission control parameter. In some embodiments, the method includes reporting, via the radio interface 82, H to the network node 16. In some embodiments, the method further includes determining a height threshold, Hr. In some embodiments, determining the height threshold, Hr, includes receiving the height threshold, Hr from a network node and/or based on a pre-defined rule. In some embodiments, controlling the out of band, OOB, emissions further comprising applying a first emission control parameter when H is greater than Hr and by applying a second emission control parameter when H is not greater than Hr. In some embodiments, controlling the out of band, OOB, emissions further comprising reducing the emissions by a first margin when H is greater than Hr and reducing the emissions by a second margin when H is not greater than Hr. Some embodiments include the following:

Embodiment A1. A network node configured to communicate with a wireless device (WD), the network node configured to, and/or comprising a radio interface and/or comprising processing circuitry configured to:

signal emission control parameter information for modifying a transmission power of the wireless device based at least in part on a height of the wireless device.

Embodiment A2. The network node of Embodiment A1, wherein the network node is further configured to, and/or the radio interface and/or processing circuitry is further configured to determine at least one emission control parameter, the emission control parameter including at least one of a maximum power reduction value and network signaling value;

the emission control parameter information indicating the determined at least one emission control parameter.

Embodiment A3. The network node of Embodiment A1, wherein the emission control parameter information indicates one of at least one emission control parameter and a criterion for applying the at least one emission control parameter, the emission control parameter including at least one of a maximum power reduction value and network signaling value.

Embodiment B1. A method implemented in a network node, the method comprising signaling emission control parameter information for modifying a transmission power of the wireless device based at least in part on a height of the wireless device.

Embodiment B2. The method of Embodiment B1, further comprising determining at least one emission control parameter, the emission control parameter including at least one of a maximum power reduction value and network signaling value; and the emission control parameter information indicating the determined at least one emission control parameter.

Embodiment B3. The method of Embodiment B1, wherein the emission control parameter information indicates one of at least one emission control parameter and a criterion for applying the at least one emission control parameter, the emission control parameter including at least one of a maximum power reduction value and network signaling value.

Embodiment C1. A wireless device (WD) configured to communicate with a network node, the WD configured to, and/or comprising a radio interface and/or processing circuitry configured to:

receive emission control parameter information for modifying a transmission power of the wireless device based at least in part on a height of the wireless device;

modify the transmission power of the wireless device based at least in part on the emission control parameter information.

Embodiment C2. The WD of Embodiment C1, wherein the emission control parameter information indicates at least one emission control parameter including at least one of a maximum power reduction value and network signaling value.

Embodiment C3. The WD of Embodiment C1, wherein the wireless device is further configured to, and/or the radio interface and/or processing circuitry is further configured to determine at least one emission control parameter, the emission control parameter including at least one of a maximum power reduction value and network signaling value, the emission control parameter information indicating a criterion for applying the at least one emission control parameter.

Embodiment D1. A method implemented in a wireless device (WD), the method comprising:

receiving emission control parameter information for modifying a transmission power of the wireless device based at least in part on a height of the wireless device; and modifying the transmission power of the wireless device based at least in part on the emission control parameter information.

Embodiment D2. The method of Embodiment D1, wherein the emission control parameter information indicates at least one emission control parameter including at least one of a maximum power reduction value and network signaling value.

Embodiment D3. The method of Embodiment D1, further comprising determining at least one emission control parameter, the emission control parameter including at least one of a maximum power reduction value and network signaling value, the emission control parameter information indicating a criterion for applying the at least one emission control parameter.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| ACLR | Adjacent Channel Leakage Ratio |
| A-MPR | Additional MRP |
| AUE | Aerial UE |
| AV | Aerial vehicle |
| AWD | Aerial Wireless Device |
| BS | Base station |
| HAPS | High Altitude Platform Systems |
| HIBS | High Altitude Platform Stations as IMT BS |
| LoS | Line of Sight |
| MRP | Maximum Power Reduction |
| NS | Network signaling |
| OOB | Out of Band |
| RB | Resource Block |
| SEM | Spectrum Emission Mask |
| UE | User equipment |
| UTM | Unmanned Traffic Management System |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with an aerial wireless device (AWD), the network node comprising a radio interface configured to:
   signal emission control parameter information for modifying a transmission power of the AWD based at least in part on a height of the AWD, the emission control parameter information indicating one or more emission control parameters;

send a height threshold to the AWD; and
   configure the AWD to control emissions by applying a first emission control parameter when the height is greater than the height threshold and by applying a second emission control parameter when the height is not greater than the height threshold;
   signaling to the AWD a mapping between the height and an emissions control parameter, wherein the emission control parameter further includes at least one of a maximum power reduction value and network signaling value, wherein:
   the mapping depends in part on a frequency of operation of the AWD and a victim wireless device interfered with by the AWD,
   the mapping assigns a respective emission control parameter to each successive range between successive height thresholds of N−1 height thresholds, N being an integer greater than 1, and the emission control parameters are applied on AWD based on one or more of velocity, direction, vector direction characteristics of the AWD.

2. A method in a network node configured to communicate with an aerial wireless device (AWD), the method comprising:
   signaling emission control parameter information for modifying a transmission power of the AWD based at least in part on a height of the AWD, the emission control parameter information indicating one or more emission control parameters;
   sending a height threshold to the AWD; and
   configuring the AWD to control emissions by applying a first emission control parameter when the height is greater than the height threshold and by applying a second emission control parameter when the height is not greater than the height threshold;
   signaling to the AWD a mapping between the height and an emissions control parameter, wherein the emission control parameter further includes at least one of a maximum power reduction value and network signaling value, wherein:
   the mapping depends in part on a frequency of operation of the AWD and a victim wireless device interfered with by the AWD,
   the mapping assigns a respective emission control parameter to each successive range between successive height thresholds of N−1 height thresholds, N being an integer greater than 1, and the emission control parameters are applied on AWD based on one or more of velocity, direction, vector direction characteristics of the AWD.

3. The method of claim 2, further comprising configuring the AWD to reduce a transmit power of the AWD in a frequency guard band.

4. An aerial wireless device (AWD) configured to communicate with a network node, the AWD comprising processing circuitry configured to:
   determine emission control parameter information for modifying a transmission power of the AWD based at least in part on a height of the AWD, determining the emission control parameter information includes at least one of:
   receiving emission control parameter information from a network node; and
   based on a pre-defined rule;
   the emission control parameter information indicating one or more emission control parameters;
   receiving a height threshold to the AWD;
   configuring the AWD to control emissions by applying a first emission control parameter when the height is greater than the height threshold and by applying a second emission control parameter when the height is not greater than the height threshold; and controlling out of band (OOB) emissions of the AWD based on the emission control parameter, wherein:

the emission control parameter further includes at least one of a maximum power reduction value and network signaling value, at least one of first and second power levels are configured based at least in part on an emission control parameter received from the network node, controlling out of band (OOB) emissions further comprising reducing the emissions by a first margin when the height is greater than the height threshold and reducing the emissions by a second margin when the height is not greater than the height threshold, and the emission control parameters are applied on AWD based on one or more of velocity, direction, vector direction characteristics of the AWD.

5. A method in an aerial wireless device (AWD) configured to communicate with a network node, the method comprising:

determining emission control parameter information for modifying a transmission power of the AWD based at least in part on a height of the AWD, determining the emission control parameter information includes at least one of:

receiving emission control parameter information from a network node; and based on a pre-defined rule;

the emission control parameter information indicating one or more emission control parameters;

receiving a height threshold;

configuring the AWD to control emissions by applying a first emission control parameter when the height is greater than the height threshold and by applying a second emission control parameter when the height is not greater than the height threshold; and controlling out of band (OOB) emissions of the AWD based on the emission control parameter, wherein:

the emission control parameter further includes at least one of a maximum power reduction value and network signaling value, at least one of first and second power levels are configured based at least in part on an emission control parameter received from the network node, controlling out of band (OOB) emissions further comprising reducing the emissions by a first margin when the height is greater than the height threshold and reducing the emissions by a second margin when the height is not greater than the height threshold, and the emission control parameters are applied on AWD based on one or more of velocity, direction, vector direction characteristics of the AWD.

6. The method of claim 5, wherein emission control parameter information depends in part on a frequency of operation of the AWD.

7. The method of claim 5, wherein emission control parameter information depends in part on a frequency of operation of a victim wireless device interfered by the AWD.

8. The method of claim 5, further comprising reporting the height to the network node.

9. The method of claim 5, further comprising receiving the height threshold at least one of:

from a network node; and based on a pre-defined rule.

10. The method of claim 9, wherein controlling out of band (OOB) emissions further comprising applying a first emission control parameter when the height is greater than the height threshold and by applying a second emission control parameter when the height is not greater than the height threshold.

* * * * *